Feb. 20, 1923.
C. ORTIZ
1,446,206
ANTIPUNCTURE DEVICE FOR PNEUMATIC TIRES
Filed June 30, 1921
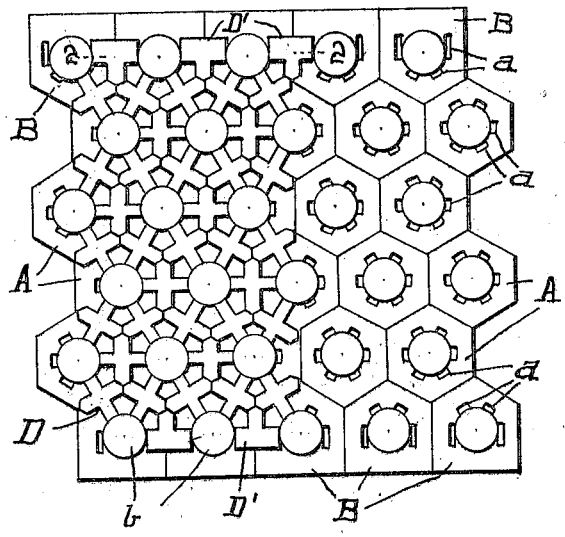
Fig. 1.
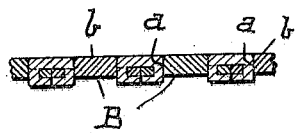
Fig. 2.
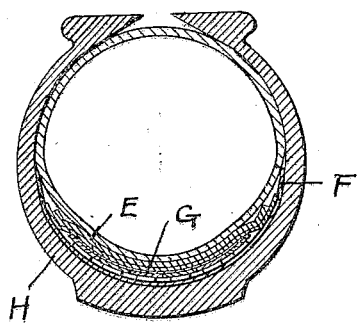
Fig. 3.
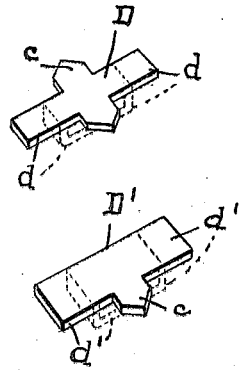
Fig. 4.
Fig. 5.
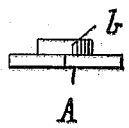
Fig. 6.
INVENTOR.
C. Ortiz.
BY H. R. Kenlake
ATTORNEY.

Patented Feb. 20, 1923.

1,446,206

UNITED STATES PATENT OFFICE.

CÉSAR ORTIZ, OF MENDOZA, ARGENTINA.

ANTIPUNCTURE DEVICE FOR PNEUMATIC TIRES.

Application filed June 30, 1921. Serial No. 481,639.

*To all whom it may concern:*

Be it known that I, César Ortiz, citizen of the Argentine Republic, and resident of Mendoza, Argentine Republic, have invented certain new and useful Improvements in an Antipuncture Device for Pneumatic Tires, of which the following is a specification.

This invention relates to an improved shield for pneumatic tires to prevent puncturing by tacks and the like. I accomplish this purpose by means of a flexible metallic shield placed between the inner pneumatic tube and the outer covering or tire. A canvas lining is placed between the shield and the pneumatic tube, and another similar lining or covering between the shield and the outer covering or tire. This canvas lining or covering is for the obvious purpose of preventing the joints in the flexible metallic shield from creating friction which might wear away the pneumatic tube and the outer tire, and also for the purpose of preventing the heating effects produced by such friction during rapid travel.

In the formation of this flexible metallic shield, it is necessary to avoid a too heavy construction, and provide a flexible structure which may, nevertheless, not have between the joints any openings of sufficient size to allow a sharp point such as that of a tack or the like to perforate the shield and puncture the pneumatic tube.

Other objects of my invention relate to the parts and combinations of parts hereinafter described with reference to the accompanying drawings in which a form of construction is shown which embodies my invention, and in which;

Figure 1 is a plan view of a portion of the flexible metallic shield made in accordance with the invention. The links connecting the elements are shown on the left hand portion of this view while said links are not illustrated on the right hand portion of the figure.

Fig. 2 is a sectional view taken on line 2—2 of Fig. 1.

Fig. 3 is a transverse sectional view of a tire casing, with the improved shield arranged therein.

Fig. 4 is a perspective view of one of the main connecting links, the dotted lines illustrating the manner in which the ends of the links are bent downwardly and towards one another for securing the main elements of the shield together.

Fig. 5 is a view similar to Fig. 4 but showing a link of the type employed at the edge portions of the shield.

Fig. 6 is a side elevation of one of the main elements of the shield.

In the above mentioned figures, the principal element of construction A is of hexagonal form, and the secondary element B used for the outer edges is of similar form, but with one of the angles eliminated for purposes which will be evident. These elements, A and B are provided with openings $a$ through which are passed the ends $d$, $d'$ of the link elements D and D', shown detached in Figures 4 and 5, which ends are then clinched on the under side, thus uniting the principal elements of construction. The central portions $c$ of the connecting elements form covers for the joints between the hexagonal elements, thus leaving no aperture through which the point of a tack or the like may pass, the only openings being the very fine ones between the edges of the parts $d$, $d'$ of the connecting elements and the outer edges of the central raised portions $b$ of these elements 2 and 3, and as these openings are practically negligible, the whole combination as shown in Figure 1 is to all intents and purposes impervious to perforations from sharp points.

As will be readily seen, the elements forming this flexible shield may be stamped from a very thin sheet of steel, and when joined as shown the construction is such as to be very light and flexible, and at the same time, proof against punctures.

It will also be evident that the size of these elements may be varied to suit different sizes of pneumatic tubes or tires, those shown being of an appropriate size for a 5 in. tube.

The canvas or similar linings E and F are shown in Figure 3, in which the protector or shield is designated G, and is arranged in the tire casing H between said linings.

Having thus described my invention, what I claim and desire to protect by Letters Patent of the United States of America is:

1. A flexible metallic shield for protecting pneumatic tires including hexagonal shaped plates arranged edge to edge and forming a strip, each of said plates being provided with radially disposed apertures, and connecting links joining said plates and having lateral extensions intermediate their ends, the lateral extensions of each link engaging the lateral extensions of other links, and said lateral extensions being arranged to cover the joints between the meeting edges of the plates.

2. In a shield as claimed in claim 1, polygonal plates arranged at the opposite edges of said strip, and each provided with link apertures, and auxiliary links connecting the polygonal plates together, each of said auxiliary links being provided with a lateral extension to aid in closing the joint between two adjacent polygonal plates, and the end of said extension engaging certain of the extensions of the first links connecting said hexagonal plates.

3. A shield as claimed in claim 1 in which the ends of said extensions are of angular shape and are adapted to engage the angular ends of certain of the other extensions.

Signed at Buenos Aires, Argentine Republic, this 16th day of April, A. D. 1921.

CÉSAR ORTIZ.

Witness:
LUIS VILLON.